(12) United States Patent
Hara et al.

(10) Patent No.: US 7,801,902 B2
(45) Date of Patent: Sep. 21, 2010

(54) APPARATUS AND METHOD FOR SURVEYING SUBSTANCE AND PROGRAM AND RECORDING MEDIUM THEREFOR

(75) Inventors: Motoaki Hara, Suwa (JP); Tomokazu Kakimi, Suwa (JP); Shoichi Mochizuki, Shimosuwa-machi (JP); Kosuke Masuzawa, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 434 days.

(21) Appl. No.: 11/909,139

(22) PCT Filed: Mar. 23, 2006

(86) PCT No.: PCT/JP2006/306607

§ 371 (c)(1),
(2), (4) Date: Sep. 19, 2007

(87) PCT Pub. No.: WO2006/101267

PCT Pub. Date: Sep. 28, 2006

(65) Prior Publication Data

US 2009/0100088 A1  Apr. 16, 2009

(30) Foreign Application Priority Data

Mar. 24, 2005  (JP) .............................. 2005-085839

(51) Int. Cl.
*G06F 17/30* (2006.01)

(52) U.S. Cl. .................... 707/748; 707/770; 707/804
(58) Field of Classification Search ................. 707/102, 707/804, 748, 770; 705/10; 712/220; 715/719
See application file for complete search history.

(56) References Cited

U.S. PATENT DOCUMENTS

| | | | | |
|---|---|---|---|---|
| 5,603,018 A | * | 2/1997 | Terada et al. ................. | 712/220 |
| 6,573,907 B1 | * | 6/2003 | Madrane ...................... | 715/719 |
| 2002/0010619 A1 | * | 1/2002 | Noborimoto et al. .......... | 705/10 |

FOREIGN PATENT DOCUMENTS

| JP | A 2002-230091 | 8/2002 |
|---|---|---|
| JP | A-2003-208382 | 7/2003 |

* cited by examiner

*Primary Examiner*—Shahid A Alam
(74) *Attorney, Agent, or Firm*—Oliff & Berridge, PLC

(57) ABSTRACT

Survey request data on a chemical substance is transmitted to a terminal 3. Entered survey request data on the chemical substance, the entry area for the survey details information on the chemical substance used in a production of a part indicated by the part identification information having been entered in the entered survey request data, is received from the terminal 3. The format of each information in the survey details information entered in the entered survey request data on the chemical substance is checked by using check definition data. The checked entered survey request data is transmitted to a predetermined apparatus.

11 Claims, 4 Drawing Sheets

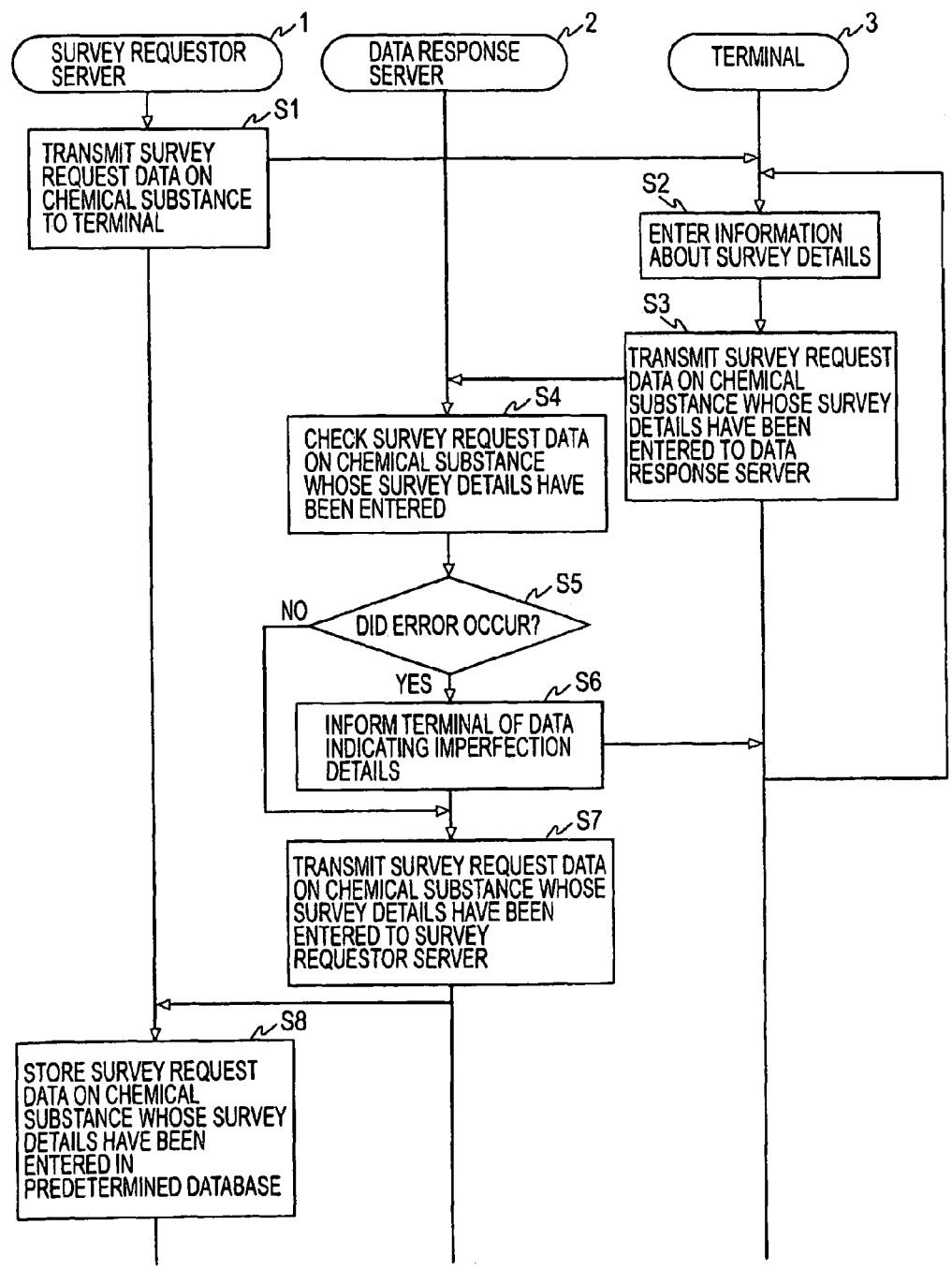

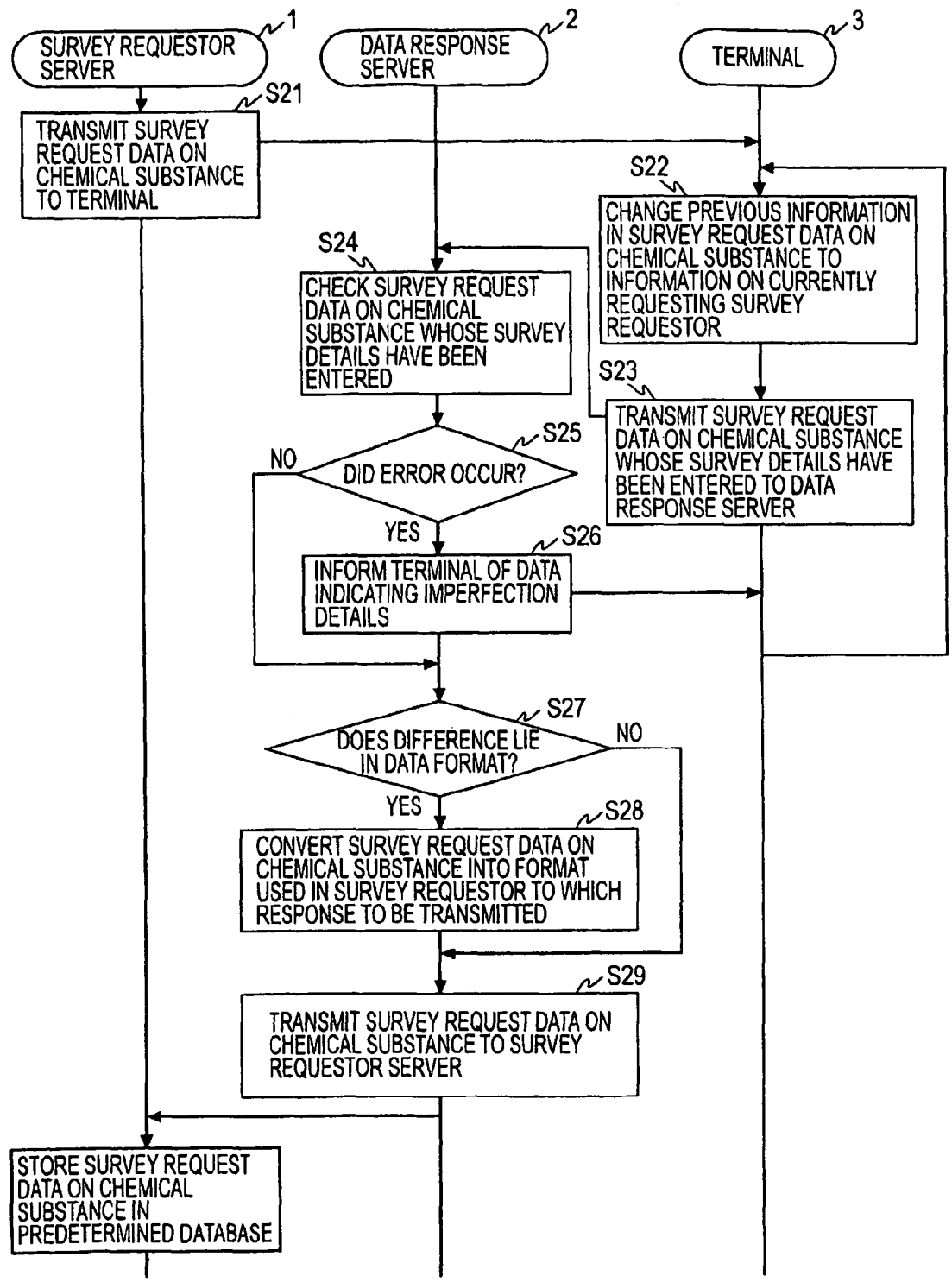

APPARATUS AND METHOD FOR SURVEYING SUBSTANCE AND PROGRAM AND RECORDING MEDIUM THEREFOR

BACKGROUND

1. Field of the Invention

The present invention relates to an apparatus and method for surveying a substance and a program and recording medium therefor suitable for surveying a chemical substance in each part in a product.

2. Background of the Invention

There is a strong worldwide movement under way to regulate the use of chemical substances in an industrial product when the industrial product is manufactured and marketed, typified by the Restriction of the Use of certain Hazardous Substances in Electrical and Electronic Equipment (RoHS) Directive in the European Union (EU) market. For example, a set manufacturer (e.g., automaker or electrical equipment maker), which assembles parts into products, conducts a survey on whether a used substance is legal by requesting a response regarding a chemical substance in each part from a parts manufacturer that produces each part. In responding to a request of survey about a chemical substance in a part, each parts manufacturer makes the response by, typically, writing information regarding the substance in a predetermined data file used for the response (e.g., data file in a file format used for a spreadsheet application or word processing application) and sending the data file to a person in charge in the set manufacturer (or alternatively, by faxing a document or the like). As a related art, a technique for managing environmental load information is disclosed in Patent Document 1. The technique collects environmental load information on parts and materials in a product from suppliers over a network, accumulates data of the collected information, and allows design of the product and preparation of various documents by using the accumulated environmental load information.

[Patent Document 1] Japanese Unexamined Patent Application Publication No. 2002-230091

When the person in charge in a set manufacturer receives the response to the request about the chemical substance in each part through the above-described processing, he or she enters the classification and the content of the chemical substance for each part into a database or the like and manages the information. However, the current processing is very inefficient, and, if the number of parts in a product is large, the number of man-hours needed to finish the processing is significantly large.

In many cases, a parts manufacturer supplies the same part to different set manufacturers. In the case where the parts manufacturer performs a response about the same part on each of the different set manufacturers, the part manufacturer is required to repeatedly make the same survey response for each set manufacturer that is a supply destination. Additionally, if the formats of documents of the responses vary from one set manufacturer to another, a problem arises in which a great deal of time and effort is required because the parts manufacturer must make a response having a survey result whose details vary with set manufacturers.

Furthermore, since a problem in which information on a chemical substance used in a product is required to be efficiently obtained and the information is required to be disclosed is common to all set manufacturers, it is preferable that a common platform exist.

Accordingly, an object of the present invention is to provide an apparatus and method for surveying a substance and a program and recording medium therefor that allow processing for retrieving information on a chemical substance in each part in a product to be efficiently performed in both a set manufacturer and parts manufacturer and that can reduce time and effort required to finish the processing.

SUMMARY OF THE INVENTION

The invention aims to solve the problems and provides an apparatus for surveying a substance. The apparatus includes a survey request data transmitting unit that transmits survey request data on a chemical substance to a terminal, the survey request data including part identification information and identification information about a survey requestor requesting a survey about the chemical substance, the survey request data holding an entry area for survey details information on the chemical substance, a survey request data receiving unit that receives entered survey request data on the chemical substance from the terminal, the entry area for the survey details information on the chemical substance used in a production of a part indicated by the part identification information having been entered in the entered survey request data, a check definition data loading unit that loads check definition data used for performing a determination whether each information entered in the entry area for the survey details information has been entered in a defined format, a format checking unit that checks a format of each information in the survey details information entered in the entered survey request data on the chemical substance by using the loaded check definition data, and a checked data transmitting unit that transmits to a predetermined apparatus the checked entered survey request data on the chemical substance.

The invention allows requesting a survey respondent to submit survey details, checking answered survey request data on a chemical substance, and collating the survey request data on the chemical substance, all these actions having been performed by the survey requestors, to be performed in a single workflow. Therefore, the tasks in each survey requestor can be significantly reduced.

In the apparatus according to the invention, in the check definition data, definition for the determination may vary depending on the survey requestor indicated by the identification information about the survey requestor.

The apparatus according to the invention may further include format definition data loading means for loading format definition data used for converting a format of the check definition data, and a format converting unit that converts the format of the check definition data by using the format definition data.

According to the invention, when a survey respondent receives requests to survey a substance in the same part from a plurality of survey requestors (e.g., set manufacturers), the survey respondent does not need to repeatedly enter survey details for each survey request data on the chemical substance because the survey request data on the chemical substance is converted into a format specific to each survey requestor to which the response is to be transmitted. Therefore, troublesome tasks required for the survey of a chemical substance in a part can be significantly reduced.

In the apparatus according to the invention, in the format definition data, the format definition may vary depending on the survey requestor indicated by the identification information about the survey requestor.

In the apparatus according to the invention, the check definition data loading unit may load the check definition data specific to the identification information about the survey requestor included in the entered survey request data on the chemical substance.

The apparatus according to the invention may further include a total weight comparing unit that compares a total weight of the part, the total weight being stored in the survey request information on the chemical substance, with a sum of weights of a plurality of chemical substances, each weight of the weights being entered in the entered survey request information on the chemical substance, and an entry imperfection informing unit that, if the sum of the weights of the plurality of chemical substances exceeds the total weight of the part, informs the terminal that the entered survey request information on the chemical substance is imperfect.

In the apparatus according to the invention, a survey requestor server may include the survey request data transmitting unit, a check definition data storing unit that stores the check definition data, and a check definition data updating unit that updates the check definition data stored in the check definition data storing unit, and a data response server may include the survey request data receiving unit, the check definition data loading unit, the checked data transmitting unit, the total weight comparing unit, and the entry imperfection informing unit.

The invention provides a program for making a computer in an apparatus for surveying a substance execute transmitting survey request data on a chemical substance to a terminal, the survey request data including part identification information and identification information about a survey requestor requesting a survey about the chemical substance, the survey request data holding an entry area for survey details information on the chemical substance, receiving from the terminal entered survey request data on the chemical substance, the entry area for the survey details information on the chemical substance used in a production of a part indicated by the part identification information having been entered in the entered survey request data, loading check definition data used for performing a determination whether each information entered in the entry area for the survey details information has been entered in a defined format, checking a format of each information in the survey details information entered in the entered survey request data on the chemical substance by using the loaded check definition data, and transmitting to a predetermined apparatus the checked entered survey request data on the chemical substance.

The program according to the invention may make the computer further execute loading format definition data used for converting a format of the check definition data into a format specific to the survey requestor indicated by the identification information about the survey requestor, and converting the format of the check definition data into the format specific to the survey requestor indicated by the identification information about the survey requestor by using the format definition data.

The invention provides a recording medium storing a program for making a computer in an apparatus for surveying a substance execute transmitting survey request data on a chemical substance to a terminal, the survey request data including part identification information and identification information about a survey requestor requesting a survey about the chemical substance, the survey request data holding an entry area for survey details information on the chemical substance, receiving from the terminal entered survey request data on the chemical substance, the entry area for the survey details information on the chemical substance used in a production of a part indicated by the part identification information having been entered in the entered survey request data, loading check definition data used for performing a determination whether each information entered in the entry area for the survey details information has been entered in a defined format, checking a format of each information in the survey details information entered in the entered survey request data on the chemical substance by using the loaded check definition data, and transmitting to a predetermined apparatus the checked entered survey request data on the chemical substance.

In the recording medium according to the invention, the program may make the computer further execute loading format definition data used for converting a format of the check definition data into a format specific to the survey requestor indicated by the identification information about the survey requestor, and converting the format of the check definition data into the format specific to the survey requestor indicated by the identification information about the survey requestor by using the format definition data.

The invention provides a method for surveying a substance in an apparatus for surveying the substance. The method includes transmitting survey request data on a chemical substance to a terminal, the survey request data including part identification information and identification information about a survey requestor requesting a survey about the chemical substance, the survey request data holding an entry area for survey details information on the chemical substance, receiving from the terminal entered survey request data on the chemical substance, the entry area for the survey details information on the chemical substance used in a production of a part indicated by the part identification information having been entered in the entered survey request data, loading check definition data used for performing a determination whether each information entered in the entry area for the survey details information has been entered in a defined format, checking a format of each information in the survey details information entered in the entered survey request data on the chemical substance by using the loaded check definition data, and transmitting to a predetermined apparatus the checked entered survey request data on the chemical substance.

The method according to the invention may further include loading format definition data used for converting a format of the check definition data into a format specific to the survey requestor indicated by the identification information about the survey requestor, and converting the format of the check definition data into the format specific to the survey requestor indicated by the identification information about the survey requestor by using the format definition data.

BRIEF DESCRIPTION OF THE DRAWINGS

FIG. 3 illustrates a first process flow in the system for surveying a substance.

FIG. 4 illustrates a second process flow in the system for surveying a substance.

DETAILED DESCRIPTION OF THE PREFERRED EMBODIMENTS

First Embodiment

Figure 1:
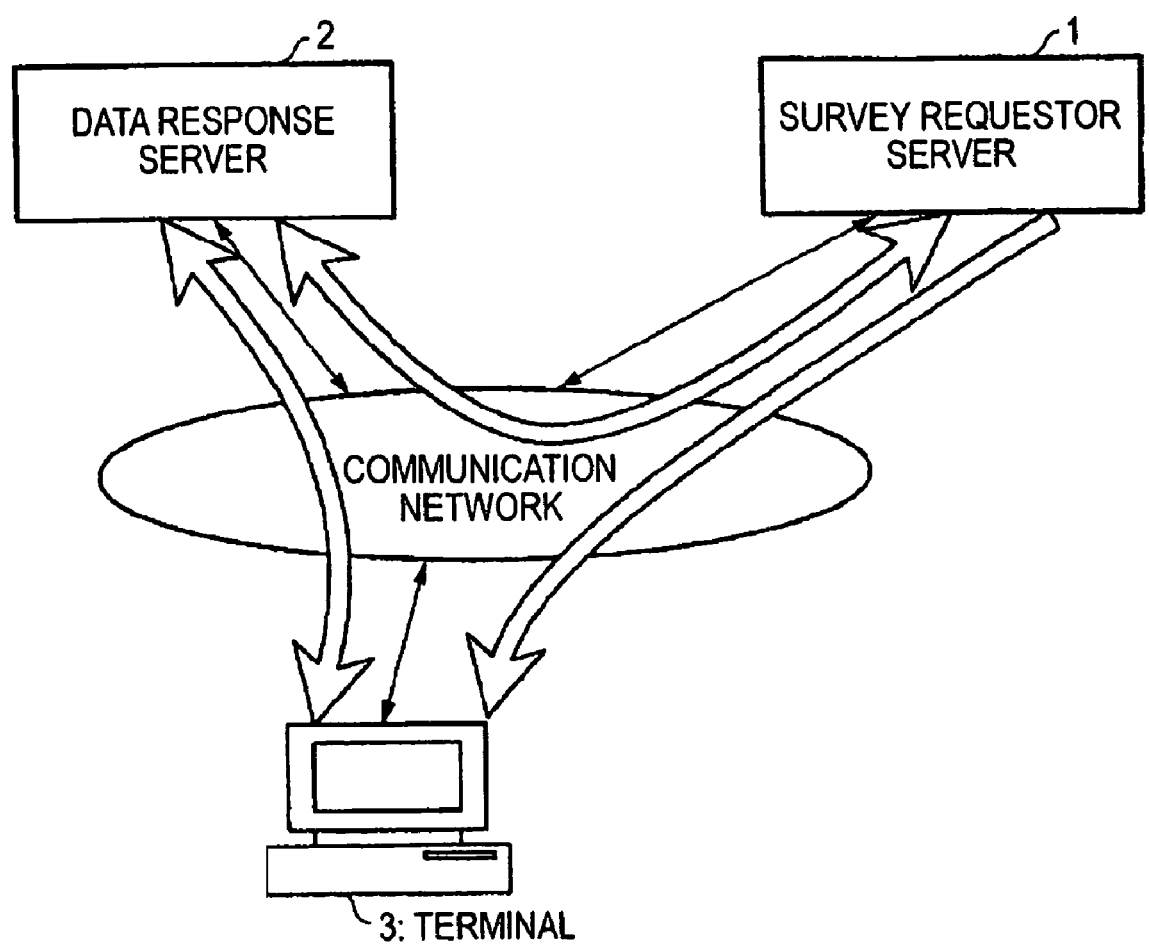
FIG. 1 is a block diagram showing the structure of a system for surveying a substance.

A system for surveying a substance according to an embodiment of the invention is described below with reference to the drawings. FIG. 1 is a block diagram showing the structure of a system for surveying a chemical substance according to the embodiment.

In FIG. 1, reference numeral 1 represents a survey requestor server managed by a survey requestor (e.g., set manufacturer) which conducts a survey of a chemical substance in a product. Reference numeral 2 represents a data response server which receives data of a response to a request of the survey from a survey respondent which received the request (e.g., parts manufacturer that produces a part in a product manufactured by the set manufacture) and returns the data to the survey requestor server 1. Reference numeral 3 represents a terminal placed in the survey respondent. The survey requestor server 1, data response server 2, terminal 3 are connected to each other via a communication network. The access to the survey requestor server 1 from the terminal 3 is blocked by the restriction in the communication network (e.g., firewall and other processing), whereas the terminal 3 can freely access the data response server 2. The number of survey requestors is typically more than one. The survey requesters can have the individual survey requestor servers 1. Alternatively, the survey requestor server 1 can be shared by the survey requestors.

Figure 2:
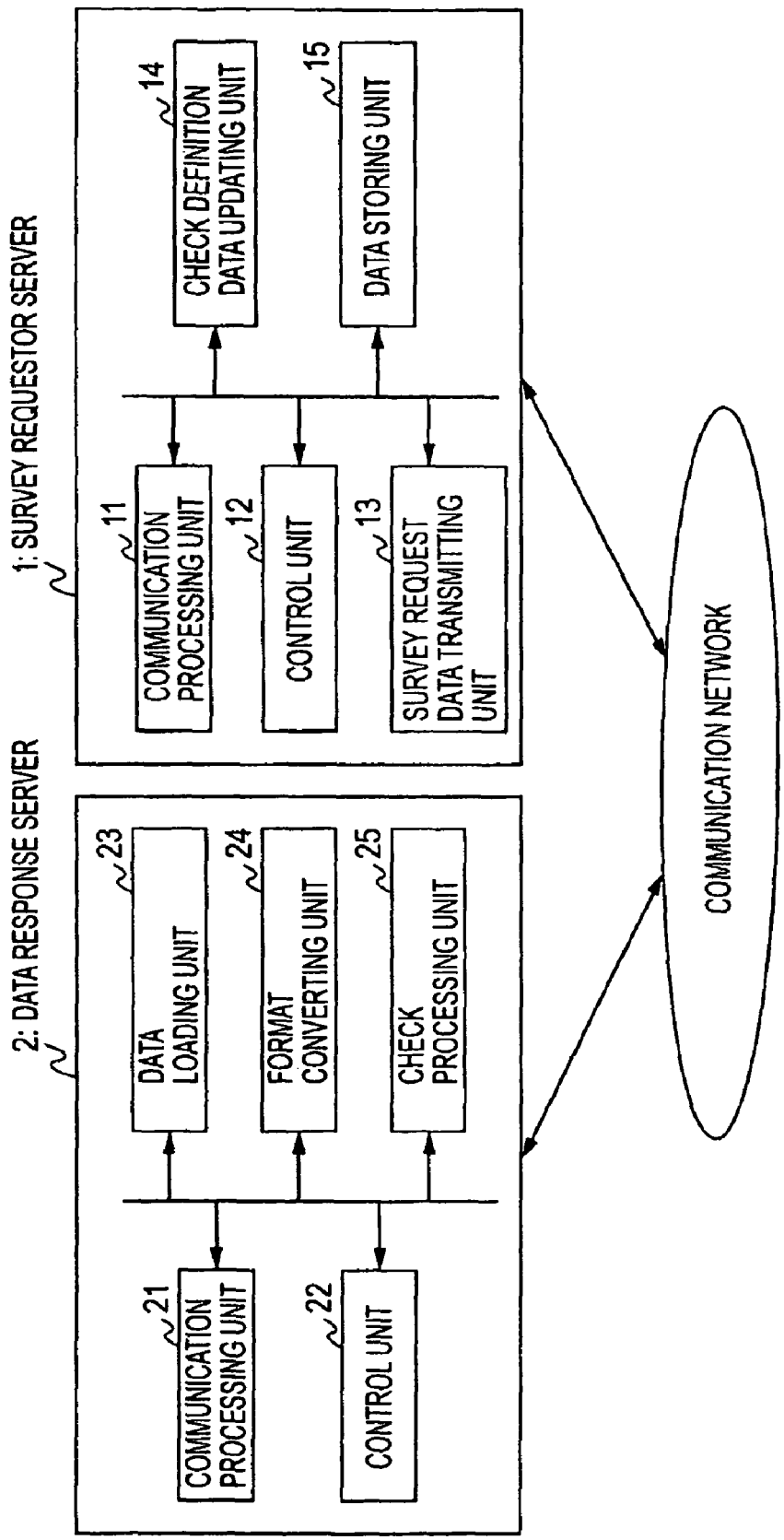
FIG. 2 illustrates a functional configuration of a survey requestor server and data response server.

FIG. 2 illustrates a functional configuration of the survey requestor server and data response server.

In the survey requestor server 1, reference numeral 11 represents a communication processing unit that transmits information to and receives information from another apparatus over a communication network. Reference numeral 12 represents a control unit that controls each controller in the survey requestor server 1. Reference numeral 13 represents a survey request data transmitting unit that instructs the communication processing unit 11 to perform a transmission of survey request data on a chemical substance, the transmission having been instructed by a person in charge. The survey request data on the chemical substance is data used to record the name and the mass of the chemical substance in a part by a person in charge in the survey respondent. A detailed explanation of the survey request data on the chemical substance is described later. Reference numeral 14 represents a check definition data updating unit that updates check definition data for checking the survey request data on the chemical substance whose survey details are stored. Reference numeral 15 represents a data storing unit that stores the check definition data and format definition data. The check definition data is specific to the survey requestor and typically stores a program that defines processing for checking the survey request data on the chemical substance. The format definition data is data that stores a program defining processing for converting the check definition data into the format for a predetermined survey requestor.

In the data response server 2 shown in FIG. 2, reference numeral 21 represents a communication processing unit that transmits information to and receives information from another apparatus over a communication network. Reference numeral 22 represents a control unit that controls each controller in the data response server 2. Reference numeral 23 represents a data loading unit that loads the check definition data and format definition data from the survey requestor server 1. Reference numeral 24 represents a format converting unit that converts the survey request data on the chemical substance into a format specific to a designated survey requestor by using the format definition data. Reference numeral 25 represents a check processing unit that checks information in the survey details stored in the survey request data on the chemical substance. Examples of this check include checking for error in the number of characters or the data format in a character string and checking for deficiency in entry to items of the survey details.

First, in order to conduct a survey of a chemical substance used in a part in a particular product, a person in charge in a survey requestor instructs the survey requestor server 1 to transmit survey request data on a chemical substance employed in a survey request regarding the part. In response to this, the survey requestor server 1 transmits the survey request data on the chemical substance to the terminal 3 in the survey respondent. A person in charge in the survey respondent enters information about the chemical substance in the part into the survey request data on the chemical substance by using the terminal 3 and then transmits the data to the entered data response server 2. The data response server 2 performs a predetermined check on the received data and returns the checked survey request data on the chemical substance to the survey requestor server 1.

FIG. 3 illustrates a first process flow in the system for surveying a substance.

The first process flow in the system for surveying a substance is described below with reference to FIG. 3.

First, in order to conduct a survey of a chemical substance used in a part in a particular product, a person in charge in the survey requestor instructs the survey requestor server 1 to transmit designated survey request data on a chemical substance. Then, the survey request data transmitting unit 13 in the survey requestor server 1 loads the survey request data on the chemical substance from the data storing unit 15 and instructs the communication processing unit 11 to transmit the loaded data to the terminal 3 in a predetermined survey respondent. The communication processing unit 11 transmits the survey request data on the chemical substance to the designated terminal 3 (step S1). The transmitted survey request data on the chemical substance includes information such as identification information on a targeted part and a deadline for a response. The survey request data on the chemical substance further includes information regarding a screen used to obtain the consent of the survey respondent to certify that no predetermined restricted material is contained (non containing certificate screen). The survey request data transmitting unit 13 can transmit the survey request data on the chemical substance to the terminal 3 in the predetermined survey respondent on the basis of information about the predetermined survey respondent entered by a person in charge in the survey requestor. Alternatively, the survey request data transmitting unit 13 can read information stored in the survey request data about the terminal in the survey respondent (e.g., a uniform resource locator (URL) or an IP address of the terminal 3 in the survey respondent) and then transmit the survey request data on the basis of the read information.

In the terminal 3, when the survey request data on the chemical substance is received, a person in charge in the survey respondent makes a display device of the terminal 3 display a screen created on the basis of the survey request data on the chemical substance. This screen displays identification information of a targeted part. Then, information in the survey details for the chemical substance used in the production of the part (e.g., the classification number, name, chemical formula, metal conversion factor, category, and mass per unit volume) is entered in a corresponding predetermined entry field (step S2). As another screen created on the basis of the survey request data on the chemical substance, a screen that prompts for the consent to certify that no restricted substance is contained appears. In this screen, when the consent is provided by, for example, clicking on a displayed button, the terminal 3 creates entered survey request data on the chemical substance whose survey details have been entered and saves the created data therein. The entered survey request data on the chemical substance whose survey details have been entered includes information regarding a certificate of non containing of restricted substances. In response to an instruction from a person in charge, the terminal 3 transmits the entered survey request data on the chemical substance whose survey details have been entered to the data response server 2 (step S3). At this time, the person in charge in the survey respondent can inform the data response server 2 of information on the survey requestor by using the terminal 3.

When the communication processing unit 21 in the data response server 2 receives the survey request data on the chemical substance, the communication processing unit 21 then transfers the received survey request data on the chemical substance to the check processing unit 25. The check processing unit 25 instructs the data loading unfit 23 to load the check definition data and format definition data from the. survey requestor server 1 in the survey requestor on the basis of the information on the survey requestor included in the survey request data on the chemical substance. Then, the data loading unit 23 loads the check definition data and format definition data from the survey requestor server 1. The check processing unit 25 checks the entered survey request data on the chemical substance whose survey details have been entered by using the check definition data loaded by the data loading unit 23 from the survey requestor server 1 (step S4). Examples of a check performed at this time. include checking of the information in the survey details included in the survey request data on the chemical substance (e.g., checks on a used language in a character string, the number of characters, character type, and the existence of characters prohibited from being entered), checking whether the format of the survey request data on the chemical substance is identical with the format used in the survey requestor, and checking whether the sum of the masses of the chemical substances in a part exceeds the total weight of the part stored in the survey request data on the chemical substance. The sum of masses of the chemical substances in a part is represented by, for example, the value calculated by the volume of substance "a"×X+the volume of substance "b"×Y where X denotes the content of substance a per unit volume and Y denotes the content of substance b per unit volume when the substances a and b are contained in part A.

When all check processing defined in the check definition data have been completed, the check processing unit 25 instructs the communication processing unit 21 to transmit the entered survey request data on the chemical substance whose survey details have been entered to the survey requestor server 1. Additionally, it is determined whether an error occurred in the check processing (step S5). If an error occurred, the terminal 3 is informed on the presence of imperfection of the entered survey request data on the chemical substance whose survey details have been entered and data indicating the details of the imperfection (step S6). The data indicating the details of the imperfection is typically data that displays information indicating what the details of the imperfection are or the entry field of the imperfection when a screen for the survey request data on the chemical substance is displayed on the display device. If it is determined that all check processing has no imperfection and the instruction from the check processing unit 25 is received, the communication processing unit 21 transmits the entered survey request data on the chemical substance whose survey details have been entered to the survey requestor server 1 (step S7). The survey requestor server 1 to which the survey request data on the chemical substance is to be transmitted can be determined on the basis of information received from the terminal 3 or on the basis of identification information on the survey requestor stored in the survey request data on the chemical substance.

When the survey requestor server 1 receives from the data response server 2 the entered survey request data on the chemical substance whose survey details have been entered, the survey requestor server 1 stores the received survey request data on the chemical substance in a predetermined database (step S8). The processing described above allows requesting the submission of the survey details, checking answered survey request data on a chemical substance, and retrieving the survey request data on the chemical substance, all these actions having been performed by the individual survey requesters (e.g., set manufacturers), to be performed in a single workflow. Therefore, the tasks in each survey requestor can be significantly reduced.

FIG. 4 illustrates a second process flow in the system for surveying a substance.

Processing performed when a plurality of survey requestors request survey about the same part is described below with reference to FIG. 4.

In the case where, after the processing previously described is performed by request from a first survey requestor, a second survey requestor requests the same survey respondent to survey the same part, the survey requestor server 1 in the second survey requestor transmits survey. request data on a chemical substance to the terminal 3 (step S21), as in the case of the above processing. When a person in charge in the survey respondent determines, from the details of the survey request data on the chemical substance received in the terminal 3 (information on a targeted part), that the survey details about the same part were transmitted, he or she makes the display device in the terminal 3 display a screen created on the basis of the entered survey request data on the chemical substance whose survey details have been entered which was transmitted to the data response server 2. The person in charge then changes the information appearing on the screen about the survey requestor which requested the previous survey to information about a currently requesting survey requestor (step S22). In response to an instruction to save the screen from the person in charge, the terminal 3 creates entered survey request data on the chemical substance whose survey details have been entered and saves the created data therein. Then, in response to an instruction from the person in charge, the terminal 3 transmits the data to the data response server 2 (step S23). At this time, the person in charge in the survey respondent can inform the data response server 2 of information on the survey requestor by using the terminal 3.

When the communication processing unit 21 in the data response server 2 receives the survey request data on the chemical substance, the communication processing unit 21 transfers the received survey request data on the chemical substance to the check processing unit 25. The check processing unit 25 instructs the data loading unit 23 to load the check definition data and format definition data from. the survey requestor server 1 in the survey requestor on the basis of the information about the survey requestor included in the survey request data on the chemical substance. Then, the data loading unit 23 loads the check definition data and format definition data from the survey requestor server 1. The check processing unit 25 checks the entered survey request data on the chemical substance whose survey details have been entered by using the loaded check definition data (step S24). At this time, as in the processing in the data response server 2 described above, checking of the information in the survey details stored in the survey request data on the chemical substance (e.g., checks on a used language in a character string, the number of characters, character type, and the existence of characters prohibited from being entered), checking whether the format of the survey request data on the chemical substance is identical with the format used in the survey requestor, and checking whether the sum of the masses of the chemical substances in a part exceeds the total weight of the part stored in the survey request data on the chemical substance are performed. If an error occurred (in step S25), as in the above first process flow, data indicating that the entered information is imperfect is transmitted to the terminal 3 (step S26).

The check processing unit 25 determines whether the data format of the survey request data on the chemical substance is different from the data format used in the survey requestor in the survey respondent by comparing the data format of the survey request data with the data format defined in the check definition data (step S27). If the check processing unit 25 determines that the data formats are different from each other, the check processing unit 25 informs the format converting unit 24 of the necessity to convert the format. The format converting unit 24 converts the format of the survey request data on the chemical substance into the format in the survey requestor at which the data is to be returned by using the format definition data loaded by the data loading unit 23 (step S28). The format converting unit 24 instructs the communication processing unit 21 to transmit the format-converted entered survey request data on the chemical substance whose survey details have been entered to the designated survey requestor. The communication processing unit 21 then transmits the survey request data on the chemical substance to the survey requestor server 1 (step S29). Therefore, even when a person in charge in a survey respondent (e.g., parts manufacturer) receives requests of survey on a substance in the same part from a plurality of survey requestors (e.g., set manufacturers), he or she does not need to repeatedly enter survey details for each survey request data on the chemical substance because the data response server 2 converts the survey request data on the chemical substance into a format specific to each survey requestor to which the response is to be transmitted on the basis of information designated by the person in charge in the survey respondent or information stored in the survey request data on the chemical substance. Therefore, troublesome tasks required for the survey of a chemical substance in a part can be significantly reduced.

Each apparatus described above includes a computer system therein. The processes described above are stored in a computer-readable recording medium in the form of a program. The processing described above is performed by the reading and execution of the program by the computer. Examples of the computer-readable recording medium include a magnetic disk, magneto-optical disk, compact disk read-only memory (CD-ROM), digital versatile disk-ROM (DVD-ROM), and semiconductor memory. The computer program can be distributed to a computer over a communications circuit, and the computer, which receives the distributed program, can execute the program.

The program can serve to perform part of the functions described above. Furthermore, a file (program) that can perform the functions described above by combining with a program that has been previously stored in the computer system, a so-called difference file (difference program), is also applicable.

What is claimed is:

1. An apparatus for surveying a substance, the apparatus comprising:
   a survey request data transmitting unit that transmits survey request data on a chemical substance to a terminal, the survey request data including part identification information and identification information about a survey requestor requesting a survey about the chemical substance, the survey request data holding an entry area for survey details information on the chemical substance;
   a survey request data receiving unit that receives entered survey request data on the chemical substance from the terminal, the entry area for the survey details information on the chemical substance used in a production of a part indicated by the part identification information having been entered in the entered survey request data;
   a check definition data loading unit that loads check definition data used for performing a determination whether each information entered in the entry area for the survey details information has been entered in a defined format;
   a format checking unit that checks a format of each information in the survey details information entered in the entered survey request data on the chemical substance by using the loaded check definition data;
   and a checked data transmitting unit that transmits to a predetermined apparatus the checked entered survey request data on the chemical substance.

2. The apparatus according to claim 1, wherein, in the check definition data, definition for the determination varies depending on the survey requestor indicated by the identification information about the survey requestor.

3. The apparatus according to claim 1, further comprising:
   format definition data loading means for loading format definition data used for converting a format of the check definition data,
   and a format converting unit that converts the format of the check definition data by using the format definition data.

4. The apparatus according to claim 3, wherein, in the format definition data, the format definition varies depending on the survey requestor indicated by the identification information about the survey requestor.

5. The apparatus according to claim 1, wherein the check definition data loading unit loads the check definition data specific to the identification information about the survey requestor included in the entered survey request data on the chemical substance.

6. The apparatus according to claim 1, further comprising:
   a total weight comparing unit that compares a total weight of the part, the total weight being stored in the survey request information on the chemical substance, with a sum of weights of a plurality of chemical substances, each weight of the weights being entered in the entered survey request information on the chemical substance;
   and an entry imperfection informing unit that, if the sum of the weights of the plurality of chemical substances exceeds the total weight of the part, informs the terminal that the entered survey request information on the chemical substance is imperfect.

7. The apparatus according to claim 1, wherein a survey requestor server includes the survey request data transmitting unit, a check definition data storing unit that stores the check definition data, and a check definition data updating unit that updates the check definition data stored in the check definition data storing unit, and a data response server includes the survey request data receiving unit, the check definition data loading unit, the checked data transmitting unit, the total weight comparing unit, and the entry imperfection informing unit.

8. A computer-readable storage medium storing a computer-executable program for surveying a substance, the program comprising instructions for:

transmitting survey request data on a chemical substance to a terminal, the survey request data including part identification information and identification information about a survey requestor requesting a survey about the chemical substance, the survey request data holding an entry area for survey details information on the chemical substance;

receiving from the terminal entered survey request data on the chemical substance, the entry area for the survey details information on the chemical substance used in a production of a part indicated by the part identification information having been entered in the entered survey request data;

loading check definition data used for performing a determination whether each information entered in the entry area for the survey details information has been entered in a defined format;

checking a format of each information in the survey details information entered in the entered survey request data on the chemical substance by using the loaded check definition data;

and transmitting to a predetermined apparatus the checked entered survey request data on the chemical substance.

9. The computer-readable storage medium according to claim 8, wherein the program comprising instructions for: loading format definition data used for converting a format of the check definition data into a format specific to the survey requestor indicated by the identification information about the survey requestor;

and converting the format of the check definition data into the format specific to the survey requestor indicated by the identification information about the survey requestor by using the format definition data.

10. A method for surveying a substance in an apparatus for surveying the substance, the method comprising:

transmitting survey request data on a chemical substance to a terminal, the survey request data including part identification information and identification information about a survey requestor requesting a survey about the chemical substance, the survey request data holding an entry area for survey details information on the chemical substance;

receiving from the terminal entered survey request data on the chemical substance, the entry area for the survey details information on the chemical substance used in a production of a part indicated by the part identification information having been entered in the entered survey request data;

loading check definition data used for performing a determination whether each information entered in the entry area for the survey details information has been entered in a defined format;

checking a format of each information in the survey details information entered in the entered survey request data on the chemical substance by using the loaded check definition data;

and transmitting to a predetermined apparatus the checked entered survey request data on the chemical substance.

11. The method according to claim 10, further comprising:

loading format definition data used for converting a format of the check definition data into a format specific to the survey requestor indicated by the identification information about the survey requestor;

and converting the format of the check definition data into the format specific to the survey requestor indicated by the identification information about the survey requestor by using the format definition data.

* * * * *